United States Patent
Kobashi et al.

(10) Patent No.: US 12,344,244 B2
(45) Date of Patent: Jul. 1, 2025

(54) VEHICLE LANE MARKING DETECTION SYSTEM

(71) Applicant: NISSAN NORTH AMERICA, INC., Franklin, TN (US)

(72) Inventors: Atsuhide Kobashi, Santa Clara, CA (US); Christopher Ostafew, Mountain View, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 67 days.

(21) Appl. No.: 17/683,156

(22) Filed: Feb. 28, 2022

(65) Prior Publication Data
US 2023/0271607 A1  Aug. 31, 2023

(51) Int. Cl.
*G01S 17/931*  (2020.01)
*B60W 30/12*  (2020.01)
(Continued)

(52) U.S. Cl.
CPC ............ *B60W 30/12* (2013.01); *B60W 50/14* (2013.01); *G01S 7/4817* (2013.01); *G01S 7/4868* (2013.01);
(Continued)

(58) Field of Classification Search
CPC ............ B60W 30/12; B60W 2420/52; B60W 2552/53; G01S 17/89; G01S 17/931
(Continued)

(56) References Cited

U.S. PATENT DOCUMENTS 8,996,228 B1 *  3/2015  Ferguson ............... G05D 1/027
                                                                 701/28
10,377,310 B2   8/2019  Tan et al.
(Continued)

FOREIGN PATENT DOCUMENTS

DE  102019213876 A1 *  3/2021
GB      2605656 A  * 10/2022  ............ B60W 30/08
(Continued)

OTHER PUBLICATIONS

Farouk Ghallabi, Fawzi Nashashibi, Ghayath El-Haj-Shhade, Marie-Anne Mittet. LIDAR-Based Lane Marking Detection For Vehicle Positioning in an HD Map. 2018 IEEE 21th International Conference on Intelligent Transportation Systems (ITSC), Nov. 2018, Maui, Hawaii, United States. (Year: 2018).*
(Continued)

*Primary Examiner* — Erick R Solis
(74) *Attorney, Agent, or Firm* — Global IP Counselors, LLP

(57) ABSTRACT

A vehicle lane marking detection system includes a 3D sensor, a driver assist component and an electronic controller. The 3D sensor is installed to a vehicle and is configured to scan physical objects around the vehicle outputting a plurality of data points each corresponding to a surface point of a physical feature. Each data point being defined by distance, direction, intensity and vertical location relative to the vehicle. The electronic controller is connected to the 3D sensor and the driver assist component. The electronic controller evaluates a point cloud defined by the data points identifying lane markings based on the intensity of the data points. The data points having intensities greater than a predetermined level are determined to correspond to lane marking and are provided to the driver assist component with the lane markings for use thereby.

18 Claims, 13 Drawing Sheets

(51) Int. Cl.
*B60W 50/14* (2020.01)
*G01S 7/481* (2006.01)
*G01S 7/486* (2020.01)
*G01S 7/51* (2006.01)
*G01S 17/08* (2006.01)
*G01S 17/89* (2020.01)

(52) U.S. Cl.
CPC ............. *G01S 7/51* (2013.01); *G01S 17/08* (2013.01); *G01S 17/89* (2013.01); *G01S 17/931* (2020.01); *B60W 2050/146* (2013.01); *B60W 2420/408* (2024.01); *B60W 2552/53* (2020.02); *B60W 2554/4041* (2020.02); *B60W 2554/80* (2020.02)

(58) Field of Classification Search
USPC ..................................................... 701/28, 42
See application file for complete search history.

(56) References Cited

U.S. PATENT DOCUMENTS

| | | | |
|---|---|---|---|
| 10,493,952 | B1 | 12/2019 | Schwie et al. |
| 10,576,972 | B2 | 3/2020 | Gokan et al. |
| 10,611,374 | B2 | 4/2020 | Sato et al. |
| 10,683,008 | B2 | 6/2020 | Pawlicki et al. |
| 10,699,457 | B2 | 6/2020 | Mohan et al. |
| 10,852,418 | B2 | 12/2020 | Wodrich et al. |
| 10,988,120 | B2 | 4/2021 | Gomes |
| 10,988,139 | B2 | 4/2021 | Fukushige et al. |
| 11,030,818 | B1 | 6/2021 | Wang et al. |
| 11,052,925 | B2 | 7/2021 | Gotou et al. |
| 11,221,622 | B2 | 1/2022 | Schwie et al. |
| 2019/0147253 | A1* | 5/2019 | Bai ............. G06F 18/2413 382/103 |
| 2020/0307692 | A1* | 10/2020 | Senn ............. B60W 30/12 |
| 2020/0339109 | A1* | 10/2020 | Hong ............. G01M 17/06 |
| 2021/0095970 | A1* | 4/2021 | Lu ............. G01C 21/3804 |
| 2021/0333397 | A1* | 10/2021 | Ghallabi ............. G01S 17/42 |
| 2021/0350147 | A1* | 11/2021 | Yuan ............. G01C 21/3837 |
| 2023/0194268 | A1* | 6/2023 | Kim ............. G01C 21/30 701/25 |

FOREIGN PATENT DOCUMENTS

WO WO-2017021781 A1 * 2/2017
WO WO-2022052881 A1 * 3/2022

OTHER PUBLICATIONS

Jiyoung Jung and Sung-Ho Bae, "Real-Time Road Lane Detection in Urban Areas Using LiDAR Data", Oct. 26, 2018, Electronics 2018, 7, 276; doi:10.3390/electronics7110276 (Year: 2018).*

"Rapid Inspection of Pavement Markings Using Mobile LIDAR Point Clouds by Haocheng Zhang, Jonathan Li, Ming Cheng, Cheng Wang in "The International Archives of the Photogrammetry, Remote Sensing and Spatial Information Sciences, vol. XLI-B1, Jul. 12-19, 2016 XXIII ISPRS Congress,, Prague, Czech (Year: 2016).*

* cited by examiner

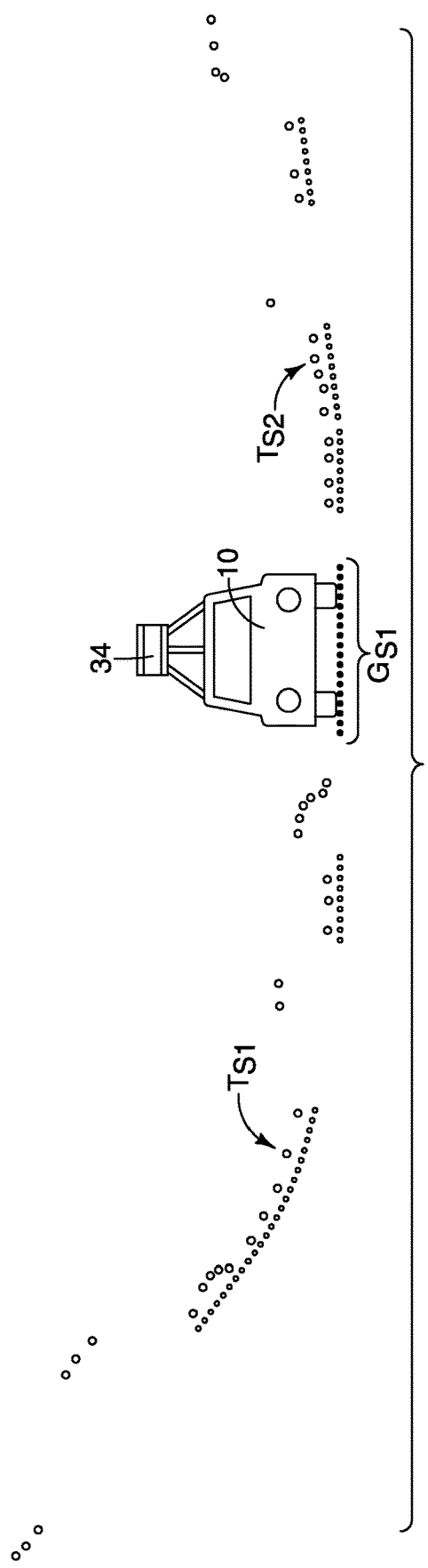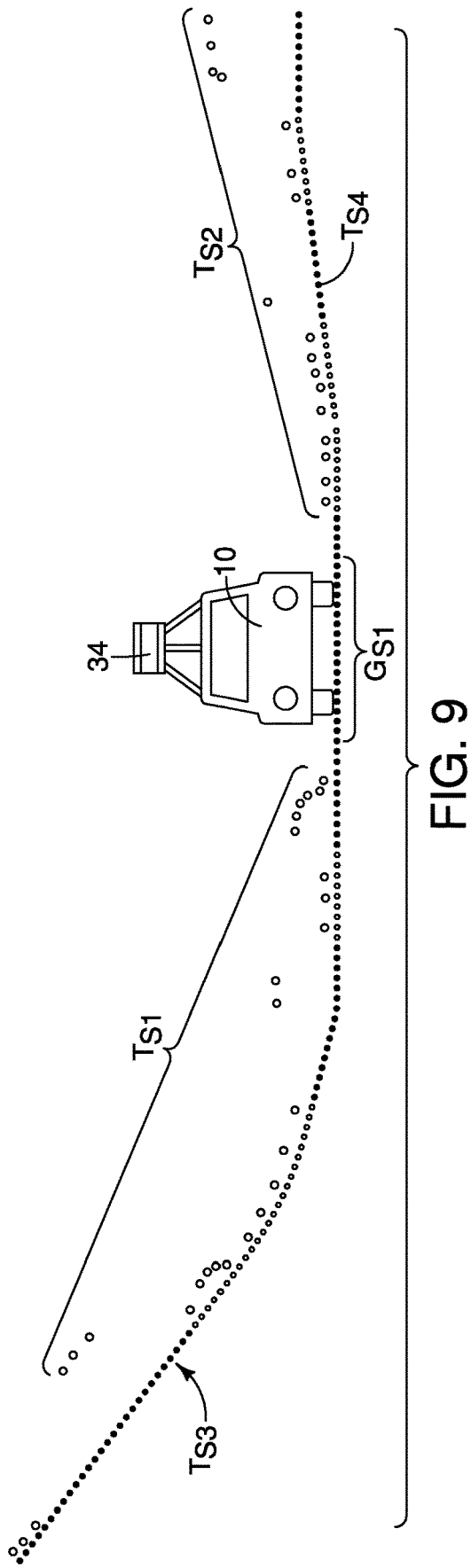

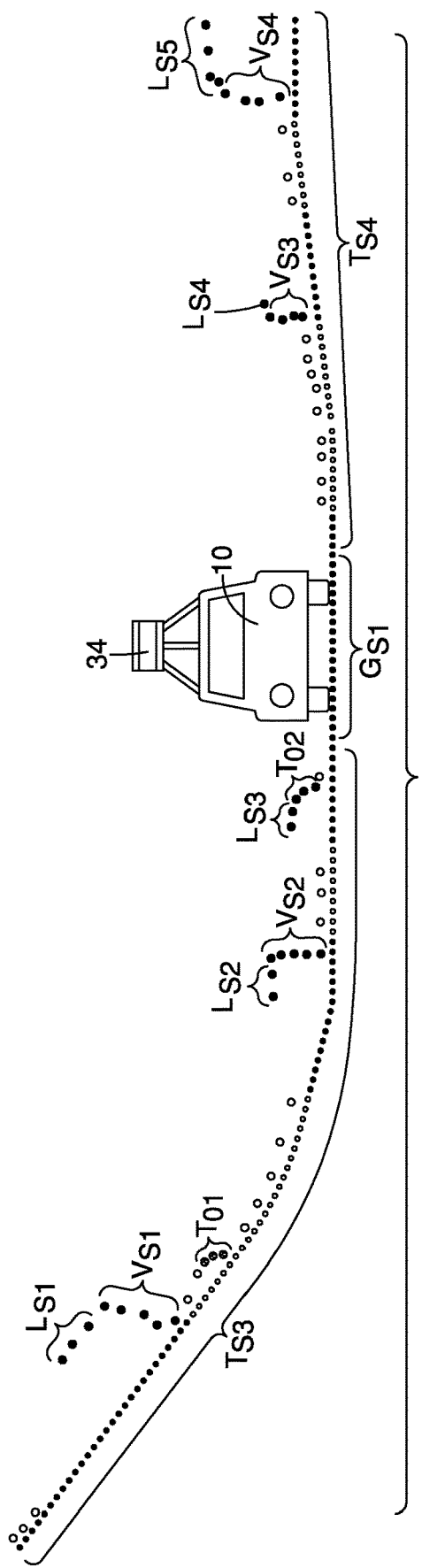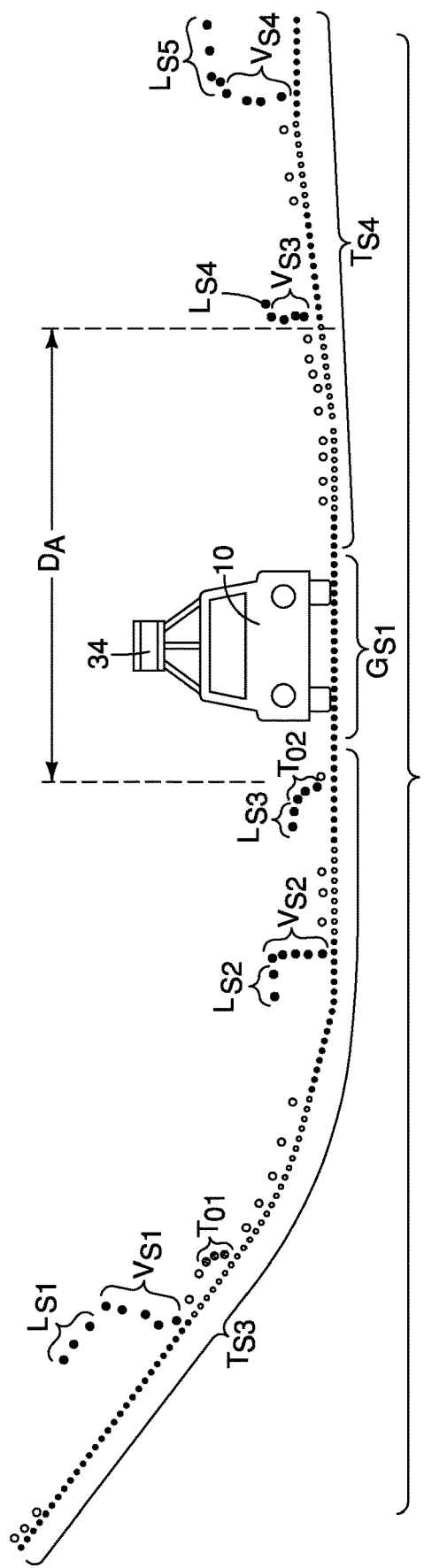
FIG. 15
FIG. 16

VEHICLE LANE MARKING DETECTION SYSTEM

BACKGROUND

Technical Field

The present disclosure generally relates to a vehicle lane marking detection system. More specifically, the present disclosure relates to a vehicle lane marking detection system that evaluates data points from a 3D sensor that scans objects and ground areas around a vehicle and outputs distance, direction, intensity and vertical height for each data point reflected off an object surface.

Background Information

Detecting physical features like curbs, speed bumps, potholes, and other physical obstructions and lane markings in the areas around a vehicle is both a taxing and critical task for a driver. It is further complicated by environmental conditions, such as darkness at night, inclement weather conditions and driver limitations, such as poor eyesight and/or obstructions such as an A-pillar, a B-pillar and other structures of a vehicle body. Detection of such features is not possible by radar. Detection of such features is not consistently possible by cameras because 3D scene understanding is only possible if the surface has non-repeating features detectable by computer vision and object identification techniques.

Lane marking detection by a camera is now well established in the market. However, camera-based lane marking detection is subject to two weaknesses: 1) lighting dependencies, 2) poor range accuracy.

SUMMARY

One object of the present disclosure is to convert 3D sensor data into a digital rendering of lane markings on a drivable area or road with object or shape recognition techniques.

In view of the state of the known technology, one aspect of the present disclosure is to provide a vehicle lane marking detection system with a vehicle, at least one 3D sensor, at least one driver assist component and an electronic controller. The at least one 3D sensor is installed to the vehicle and is configured to scan physical objects forward of and along lateral sides of the vehicle outputting point cloud that includes a plurality of data points. Each data point of the point cloud corresponds to a surface point of a physical feature, each data point being defined by distance, direction, intensity and vertical location relative to the vehicle. The electronic controller is connected to the at least one 3D sensor and the at least one driver assist component. The electronic controller evaluates the point cloud from the 3D sensor. Specifically, the evaluation includes each of a plurality of the point clouds identifying ground features forward and along lateral sides of the vehicle. All data points from the point cloud with vertical locations above a predetermined height of ground are identified and extracted. Data points related to roadway lane markings based on intensity of the data points are identified. The identified data points have intensities greater than a predetermined level. The identified data points are also evaluated relative to predetermined geometric shapes corresponding to lane marking models identifying lane markings. The identified lane markings are then provided to the at least one driver assist component for use thereby.

BRIEF DESCRIPTION OF THE DRAWINGS

Referring now to the attached drawings which form a part of this original disclosure:

FIG. 8 is yet another two-dimensional schematic view of the vehicle and the 3D sensor showing the data points of the point cloud after the first evaluation by the electronic controller where identified vertical groups of data points are temporarily removed from the point cloud with the electronic controller beginning to conduct a second evaluation of data focusing on ground points in the point cloud in accordance with the first embodiment;

FIG. 9 is another two-dimensional schematic view of the vehicle and the 3D sensor showing the data points of the point cloud after the second evaluation by the electronic controller showing an estimation of the ground surface or terrain around the vehicle with remaining groups of data points of the point cloud in accordance with the first embodiment;

FIG. 15 is two-dimensional schematic view of the vehicle and the 3D sensor showing all groups of digital data points of the point cloud being re-assembled without discarded data points, identifying terrain, a curb and various obstacles and objects surrounding the vehicle in accordance with the first embodiment;

FIG. 16 is a two another two-dimensional schematic view of the vehicle and the 3D sensor showing a drivable area around the vehicle identified by the electronic controller in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
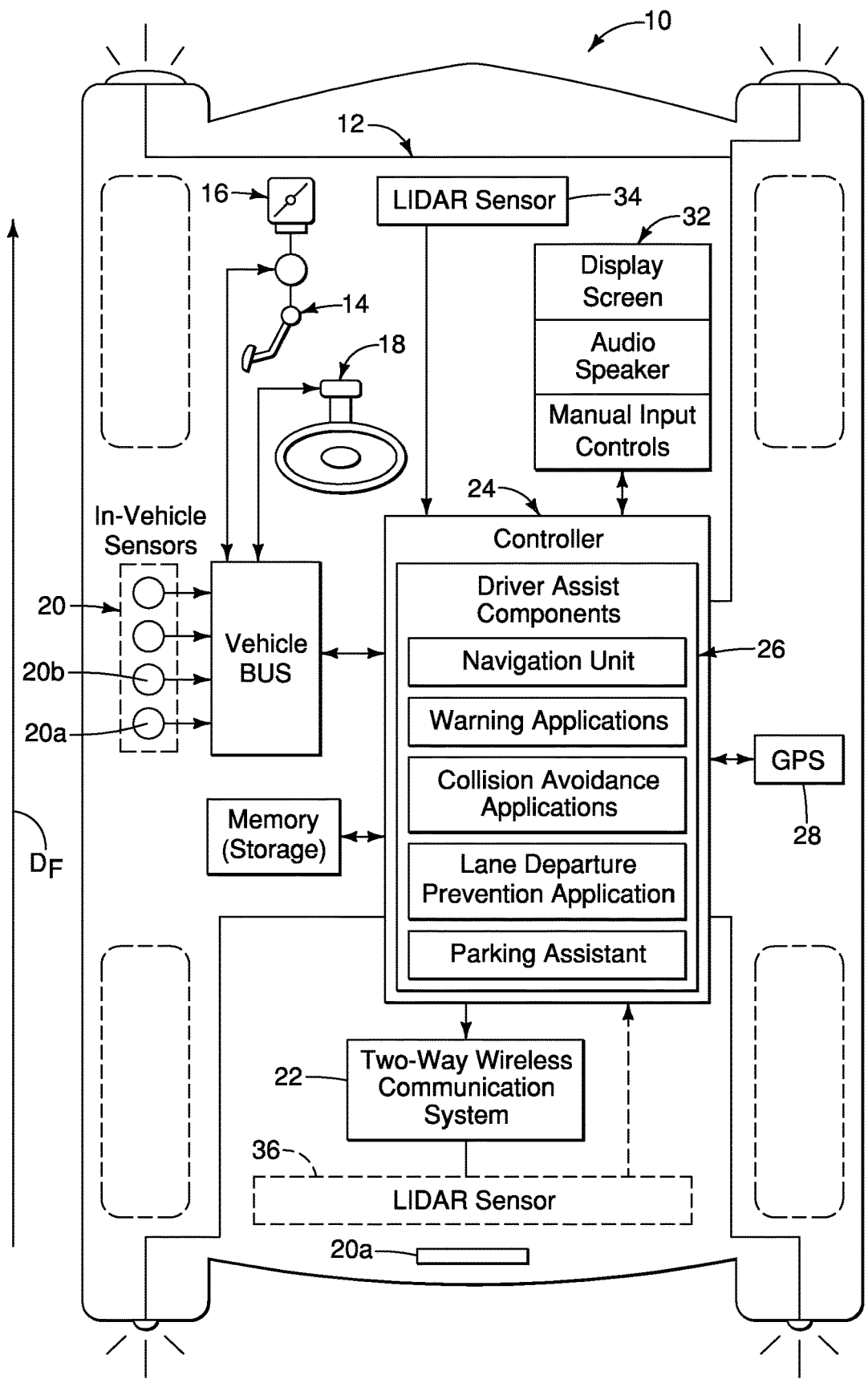
FIG. 1 is a schematic top view of a vehicle that includes an electronic controller and at least one 3D sensor connected to the electronic controller, the electronic controller being connected to or including a plurality of driver assist applications in accordance with a first embodiment.

Referring initially to FIG. 1, a vehicle 10 with a vehicle lane marking detection system 12 is illustrated in accordance with a first embodiment. The vehicle 10 can be any of a variety of vehicle designs, including a sedan, a coupe, an SUV (sports utility vehicle), a van, a pickup truck or a commercial vehicle. The vehicle 10 includes, among other features and components, a passenger compartment (not shown), the vehicle lane marking detection system 12, a braking system 14, an accelerator 16 connected to an engine (not shown) and a steering system 18. The vehicle 10 further includes a plurality of sensors 20, an optional two-way wireless communication system 22, an electronic controller 24, a plurality of driver assistance components 26, a GPS 28, a display 32, a first 3D sensor 34 (a LIDAR device) and an optional second 3D sensor 36 (a second LIDAR device).

The vehicle lane marking detection system 12 is described further herein below. The braking system 14, the accelerator 16 and the steering system 18 are all conventional vehicle components that are manually operated by a vehicle operator (not shown). Each of the braking system 14, the accelerator 16 and the steering system 18 are also configured to by electronically operated by one or more of the driver assistance components 26 via the electronic controller 24, as is described further herein below.

The plurality of sensors 20 can include at least sonar/radar sensors 20a installed to forward and/or rearward areas of the vehicle 10, in a conventional manner. The plurality of sensors 20 can further include a speed sensor 20b connected to the engine (not shown) and/or the transmission (not shown) or the wheels of the vehicle 10 for sensing current speed of the vehicle 10 to provide the electronic controller 24 with an indication of distance traveled over time. Each of the plurality of sensors 20 is further connected to the electronic controller 24 such that measurements and detected conditions from the plurality of the sensors 20 can be evaluated by the electronic controller 24 as needed or desired.

The optional two-way wireless communication system 22 is configured for communications with other vehicles, internet communications, communication with traffic control towers and/or satellite communications in a conventional manner. The driver assistance components 26 are described further herein below.

The GPS 28 and the display 32 are conventional features installed to the vehicle 10 in a conventional manner.

The first 3D sensor 34 is, for example, a LIDAR device that includes one or a plurality of lasers that emit light and then measure the time for reflected light to return. LIDAR devices are configured such that there are approximately 10-25 scans per second and a corresponding number of point clouds of data points representing returned reflections, each reflection defining a data point. It should be understood that there are a variety of commercially available LIDAR devices, some operating at 100 Hz and some as fast as 400

Hz. The first 3D sensor 34 can alternatively be one of these other commercially available LIDAR devices. A plurality of data points collected by the LIDAR device form a point cloud. Each point in the point cloud corresponds a small surface portion of an object that has been scanned. Each data point includes distance, direction and height of the small surface portion of the object that relative to the LIDAR device. Since the first 3D sensor 34 is mounted to the vehicle 10, all data points of the point cloud collected by the first 3D sensor 34 are measurements made relative to the vehicle 10. The first 3D sensor 34 can alternatively be a plurality of first 3D sensors installed, for example, at spaced apart locations along the front bumper assembly of the vehicle 10. For example, there can be six 3D sensors installed to the front bumper. Still further, the first 3D sensor 34 can be a FMCW (frequency modulated continuous wave) LIDAR device that, instead of sending out a pulse of light, outputs a continuous laser beam (not a pulse) with a continuously changing optical frequency. By comparing and processing the optical frequency of the reflected beam with the frequency when it was sent out, the electronic controller 24 can determine the distance as well as a Doppler velocity for that particular data point.

Figure 18:
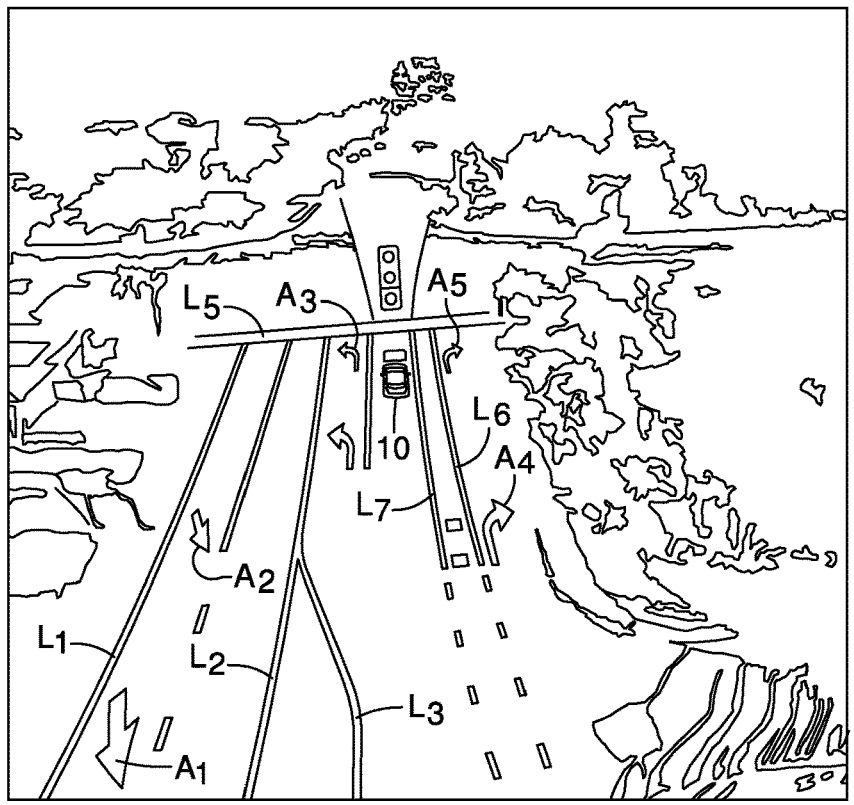
FIG. 18 is an overhead digital view of the evaluated and filtered point cloud showing drivable areas bordered by lane marking lines and traffic arrows along or defining drivable areas in accordance with the first embodiment.

The first 3D sensor 34 (a LIDAR device) is further configured to scan areas forward and along lateral sides of the vehicle 10. Specifically, the laser(s) and optical detectors or mirrors within the LIDAR device scan relative, for example, a vertical axis and scanning side-to-side with a scanning sweep of approximately 180 degrees or close to 180 degrees, as shown in FIG. 18. Further, during the movement of the laser(s) and optical detectors within the LIDAR device multiple data points are collected with each degree of the 180 degree scan. Further, with the vehicle 10 in motion, many point clouds are collected are collected each second of operation of the first 3D sensor 34. The data points collected by the first 3D sensor 34 therefore can assembly a plurality of point cloud per second. It should be understood from the drawings and the description herein that it is also possible to have a single 3D sensor (a LIDAR device) capable of scanning 360 degrees about the vehicle 10. The first 3D sensor 34 can alternatively be a LIDAR device that scans 360 degrees about the vehicle 10.

The first 3D sensor 34 is preferably installed to the vehicle at a high location of the vehicle 10, such as the roof of the vehicle 10, or just forward of the rearview mirror (not shown) at the top of a windshield (not shown) of the vehicle 10. If an optional second 3D sensor 36 is employed, it is preferably installed to a rearward location of the vehicle, such as the rear of the roof (not shown) of the vehicle 10 or other elevated area of a rearward portion of the vehicle 10. The optional second 3D sensor 36 is also a LIDAR device, as described above. As with the first 3D sensor 34, the second 3D sensor 36 can alternatively be a plurality of second 3D sensors installed, for example, at spaced apart locations along the rear bumper assembly of the vehicle 10.

The vehicle lane marking detection system 12 of the present invention includes at least the first 3D sensor 34 (a LIDAR device), the electronic controller 24 and at least one of the plurality driver assistance components 26.

The electronic controller 24 preferably includes a microcomputer with a point cloud processing and lane marking detection system control program that processes point cloud data from LIDAR devices controls the plurality driver assistance components 26, as discussed below. The electronic controller 24 can also include other conventional components such as an input interface circuit, an output interface circuit, and storage devices (memory) such as a ROM (Read Only Memory) device and a RAM (Random Access Memory) device. The microcomputer of the electronic controller 24 is programmed to control the first 3D sensor 34 and process point cloud data received therefrom. The memory circuit stores processing results and control programs such as ones for driver assist component operation that are run by the processor circuit. The electronic controller 24 is operatively coupled to the driver assistance components 26, the first 3D sensor 34, the braking system 14, the accelerator 16 and the steering system 18 in a conventional manner. The internal RAM of the electronic controller 24 stores statuses of operational flags and various control data. The electronic controller 24 is capable of selectively controlling any of the components of the plurality driver assistance components 26 and the lane marking detection system 12 in accordance with the control program.

The electronic controller 24 is configured to operate the 3D sensor 34 causing it to scan and capture data using laser imaging up to 100 times per second, detecting height, direction and distance relative to the vehicle 10. As mentioned above, the data points in each point cloud collected by the 3D sensor 34 represent ground surface features including vertical obstacles, non-vertical obstacles and a drivable area or areas proximate the vehicle 10 within a line-of-sight of the 3D sensor 34.

More specifically, the electronic controller 24 (installed within the vehicle 10) is electronically connected to the 3D sensor 34. During operation of the 3D sensor 34, the electronic controller 24 receives the plurality of point clouds from the 3D sensor 34 and thereafter evaluates and processes the received data in a manner depicted in FIGS. 2 and 3 and demonstrated in FIGS. 4-17 to identify drivable area data points that are provided to, for example, one or more of the plurality of driver assistance components 26, as described further below.

The processing operations conducted by the electronic controller 24 on the point clouds of the lane marking detection system 12 can generally be broken down into at least four basic evaluations of the data points in each of the point clouds: 1) Accumulate point clouds, 2) Extract data points related to lane markings, 3) Fit lane marking models to the points, 4) Enable other features of the vehicle 10 to access the LIDAR-based lane markings that have been detected. For example, the identified groups of data points of the point clouds relating to lane markings can be provided to at least one of the driver assistance components 26, as described further below.

The four basic steps of data collection and evaluation by the electronic controller 24 of the lane marking detection system 12 are further described below.

First, the point cloud accumulation step takes into consideration the following. Point clouds often have low vertical resolution. Therefore, in order to accurately detect and associate features that extend out from the vehicle, multiple point clouds are accumulated. In order to accumulate multiple point clouds over time, a relative pose estimate of the 3d sensor 34 sensor must be determined. This can be done by wheel odometry (100 Hz) and/or point cloud registration using movement data based on readings from the speed sensor 20b.

Second, the identification and extraction of data points related to lane markings is in part possible because each data point collected by the 3D sensor 34 (a LIDAR device) includes intensity information in addition to direction, distance and vertical height relative to the vehicle 10. Typically, the paint used for road markings is highly reflective, meaning that the lane markings are noticeably different in intensity from all other data points collected from surface areas of the ground or road surface, which typically is made of regular asphalt. Therefore, the electronic controller 24 can identify lane markings based on an intensity threshold from each data points in the accumulated point cloud thereby revealing data points associated with lane markings.

Figure 21:
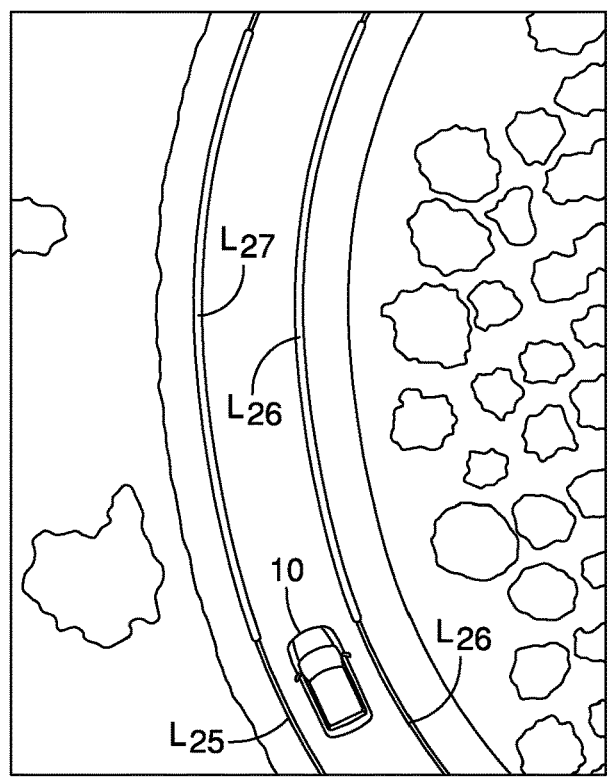
FIG. 21 is another overhead digital view of the evaluated and filtered point cloud showing a curving roadway bordered by correspondingly curving lane marking lines and traffic arrows with portions of the lane marking lines being estimated by assuming a stable or consistent continuation of curves of detected lane markings in accordance with the first embodiment.

Third, the data points corresponding lane marking and stop lines on road surface can be estimated beyond the current point cloud identification of some lane markings and stop lines. Specifically, the electronic controller 24 includes lane marking models, traffic arrows (on road surface), stop line models and cross-walk models that can be used for model fitting with current data points of each point cloud. As described further below with reference to FIG. 21, some road surfaces can be curved. The radius of curvature of identified data points corresponding to lane markings can be used to model a continuation of the corresponding curved lane markings, as shown in FIG. 21. A variety of techniques could be applied to do this—sliding window filters or gradient following for lane marking detection, neural networks or other image processing techniques for symbol detection, etc.

Fourth, the data points corresponding to lane markings, can be used by other features of the vehicle 10 such as the plurality of driver assistance components 26 (also referred to as driver assist components 26). For example, data points corresponding to, for example, lane markings and stop lines, cross-walks can now be used for keeping the vehicle 10 within the boundaries of a traffic lane, stop-line control, and localization during evasive maneuvers, as is described further below.

It should be understood that the vehicle 10 is almost always in motion when the first 3D sensor 34 is operating. Therefore, a plurality of cloud points are collected for processing in order to clearly define obstacles around the vehicle 10 and lane markings in the collections of data points in each point cloud. The speed sensor 20*b* of the vehicle 10 is connected to the electronic controller 24 such that each point cloud received by the electronic controller 24 is correlated by speed to distance traveled. Alternatively, the electronic controller 24 can be connected to an odometer (not shown) of the vehicle 10 to correlate point clouds to distance traveled.

Figure 2:
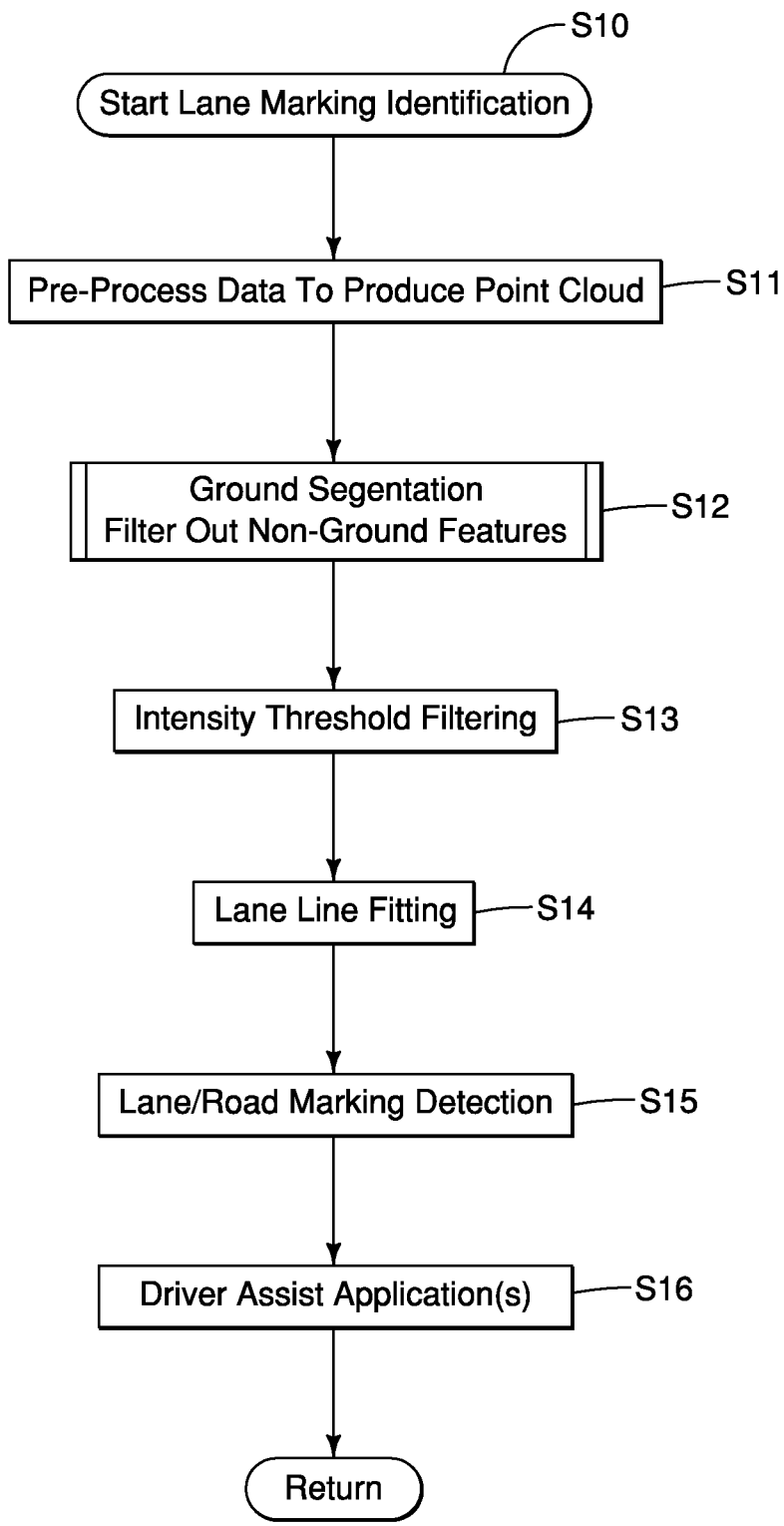
FIG. 2 is a first flowchart showing basic steps conducted by the electronic controller in accordance with the first embodiment.
Figure 3:
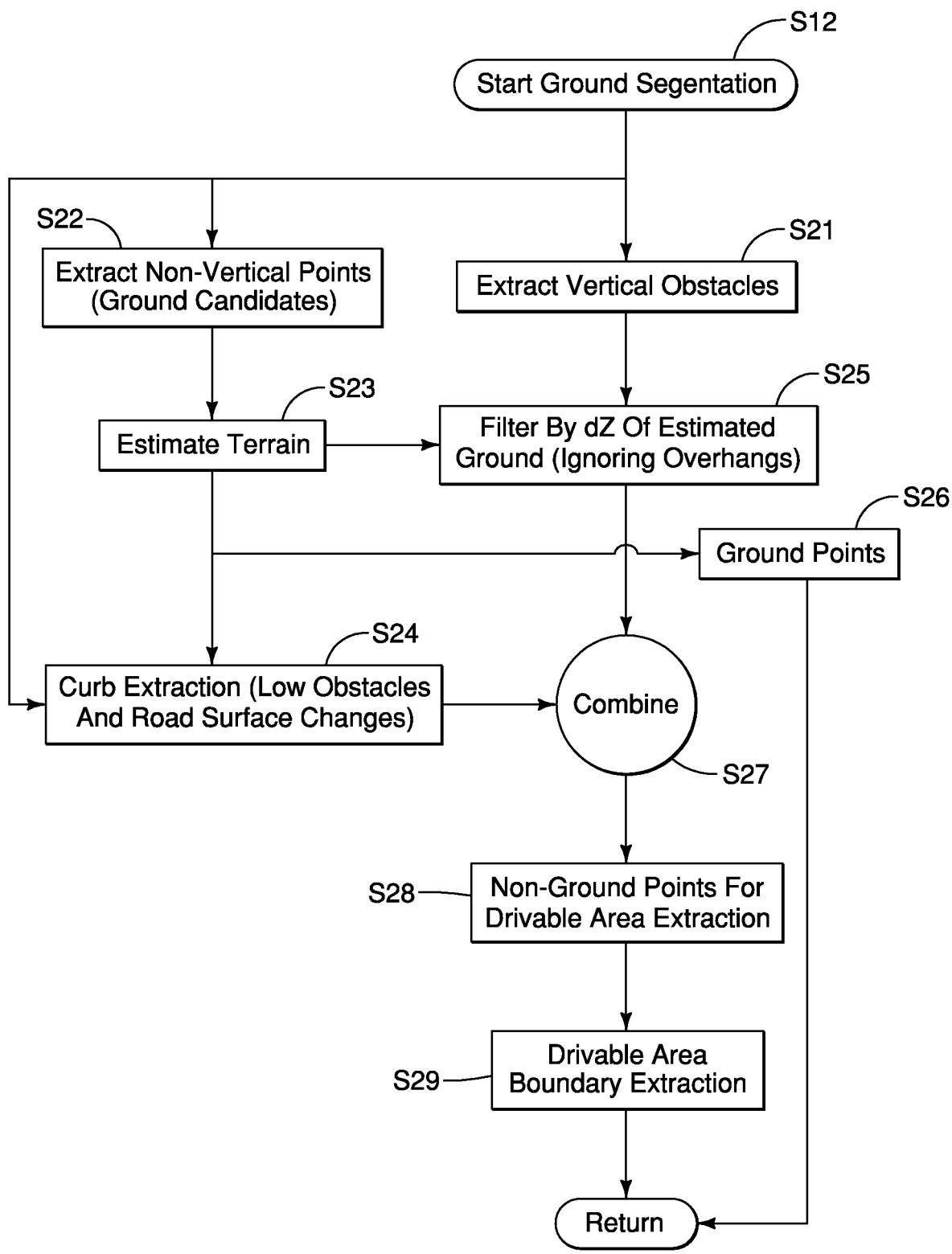
FIG. 3 is a second flowchart showing steps conducted by the electronic controller in the evaluation and extraction of data received from the 3D sensor in accordance with the first embodiment.

A description of the basic operational steps controlled by the electronic controller 24 are now described with specific reference to FIGS. 2 and 3.

As shown in FIG. 2, when the vehicle 10 is operating, at step S10, the lane marking identification process is started and the 3D sensor 34 starts operating collecting data points and assembling point clouds. At step S11, the electronic controller 24 begins receiving point clouds from the first 3D sensor 34 and filters out weak data points and other noise from the data collected by the first 3D sensor 34.

Figure 4:
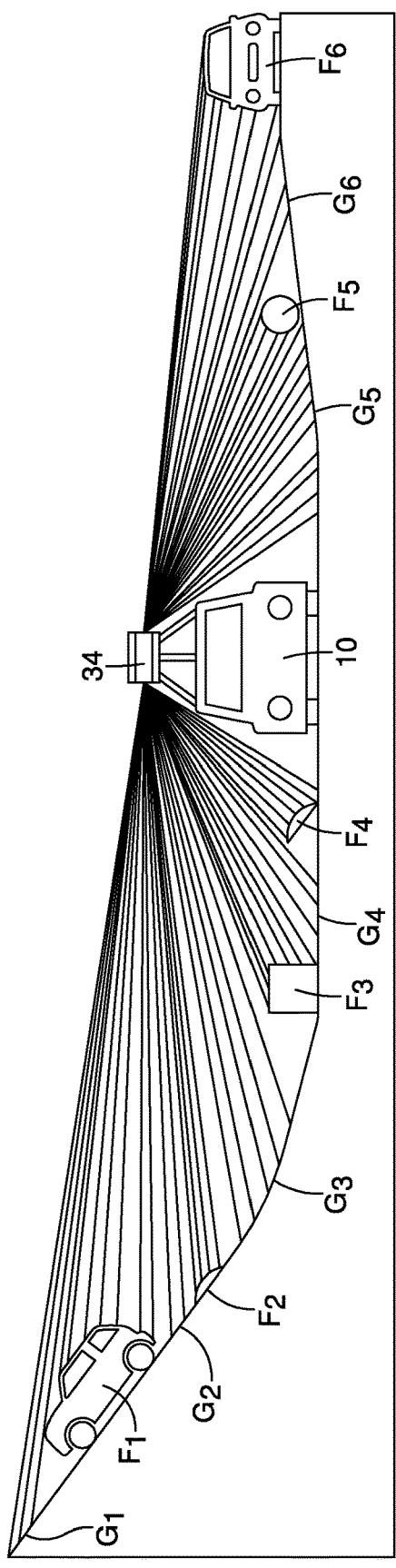
FIG. 4 is a two-dimensional schematic view of the vehicle and the 3D sensor showing various features around the vehicle including objects, obstacles, a curb and ground features showing lines-of-sight from the 3D sensor to surface portions of many the objects, obstacles, a curb and ground features during a scan by the 3D sensor in accordance with the first embodiment.
Figure 5:
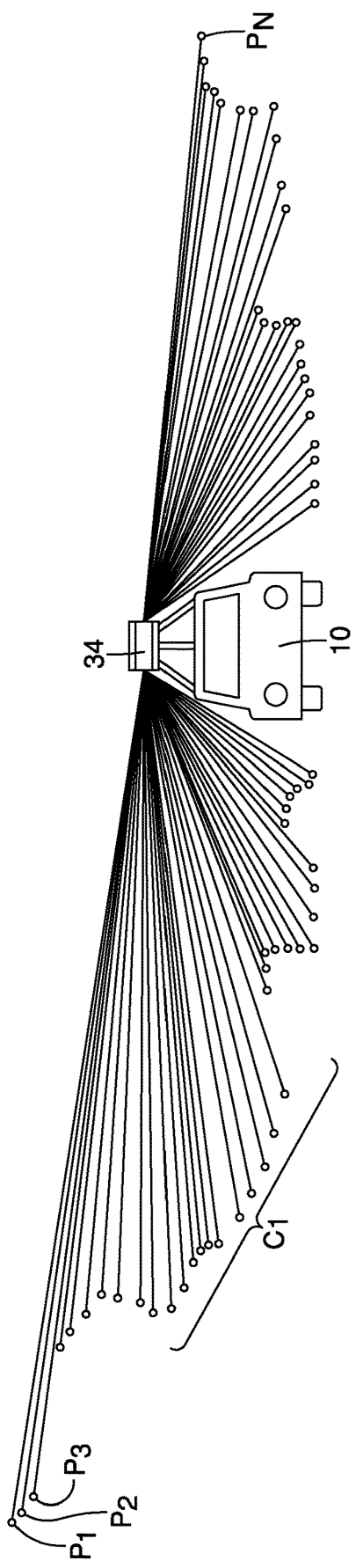
FIG. 5 is another two-dimensional schematic view of the vehicle and the 3D sensor showing data points that define a two-dimensional portion of point cloud where each data point of the point cloud corresponds to light reflections off surface portions of the various features around the vehicle including the objects, obstacles, the curb and some of the ground features in accordance with the first embodiment.
Figure 6:
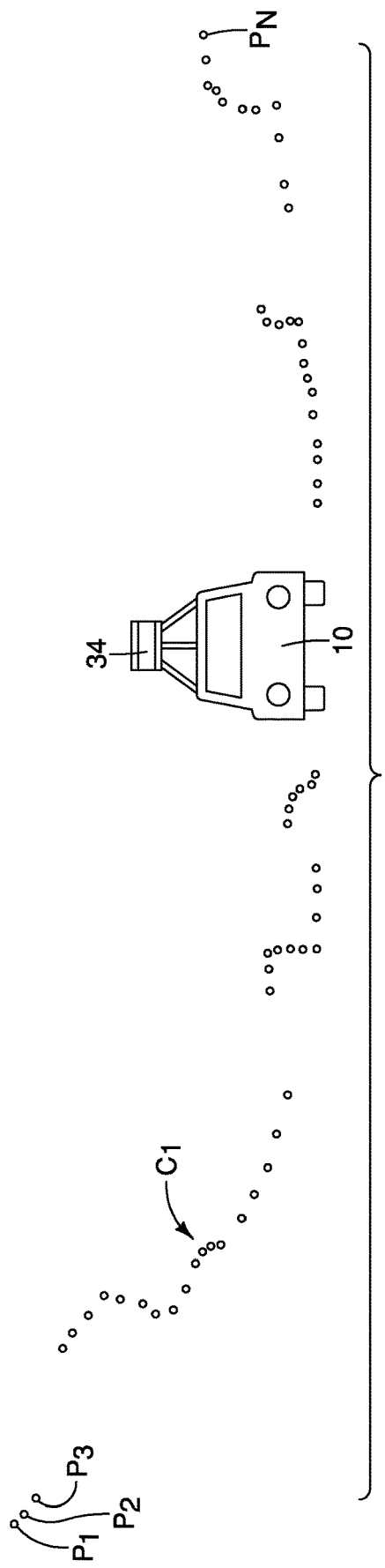
FIG. 6 is another two-dimensional schematic view of the vehicle and the 3D sensor showing the digital data points of the point cloud, each data point corresponding to surface portions of the various features around the vehicle, each digital data point having distance, direction and height information relative to the vehicle of the corresponding surface portion with the first embodiment.

A two-dimensional depiction of features $F_1$, $F_2$, $F_3$, $F_4$, $F_5$ and $F_6$ and ground portions $G_1$, $G_2$, $G_3$, $G_4$, $G_5$ and $G_6$ around the vehicle 10 is shown in FIG. 4. Lines of sight extending from the first 3D sensor 34 are shown surface portions of each of the features $F_1$, $F_2$, $F_3$, $F_4$, $F_5$ and $F_6$ and each of the ground portions $G_1$, $G_2$, $G_3$, $G_4$, $G_5$ and $G_6$ is also shown representing the scanning and surface detection process of the first 3D sensor 34. FIG. 5 shows a two-dimensional depicted of an example of a point cloud $C_1$ that includes data points detected by the first 3D sensor 34 of surface portions of features $F_1$, $F_2$, $F_3$, $F_4$, $F_5$ and $F_6$ and ground portions $G_1$, $G_2$, $G_3$, $G_4$, $G_5$ and $G_6$ depicted in FIG. 4. Both FIGS. 4 and 5 also shows line-of-sight lines from the data points to the 3D sensor 34. In FIG. 6, the line-of-sight lines from the data points to the 3D sensor 34 are removed leaving only the point cloud $C_1$ and the vehicle 10 with the 3D sensor 34.

The data points depicted in FIGS. 5 and 6 represent an example of only a portion of a first point cloud $C_1$. Specifically, since FIG. 4 is a two-dimensional representation of areas on either lateral side of the vehicle 10, the data points of those features and ground portions forward of the vehicle 10 are not visible in FIGS. 5-6. However, those features and ground portions forward of the vehicle 10 are scanned generating corresponding data points being generated by the 3D sensor 34, as shown in FIGS. 18-23 and discussed further below. Correspondingly, the two-dimensional representation in FIG. 6 is only shows a sub-set of the data points of the point cloud $C_1$. It should be understood from the drawings and description herein that the partial point cloud $C_1$ depicted in FIGS. 5 and 6 includes additional data points (not shown) that corresponding to surface portions of features, objects and ground portions forward of the vehicle 10 that not visible in FIGS. 4-6.

At step S11 in FIG. 2, the electronic controller 24 receives and loads all the data points that make up the point cloud $C_1$ detected by the first 3D sensor 34. Each data point $P_1$ thru $P_n$ in FIGS. 5 and 6 is based on a reflection of a portion of the surface of one of the features $F_1$, $F_2$, $F_3$, $F_4$, $F_5$ and $F_6$ or an area of one of the ground portions $G_1$, $G_2$, $G_3$, $G_4$, $G_5$ and $G_6$.

At step S12 in FIG. 2, the electronic controller 24 evaluates point cloud after point cloud from the 3D sensor 34 and generates a processed point cloud $C_P$ shown in FIG. 17 as is described in greater detail below with reference to FIG. 3. The processed point cloud $C_P$ includes data points representing, for example, vertical obstacles and non-vertical obstacles and a drivable area that can define a roadway. The specific operations and evaluations conducted by the electronic controller 24 are depicted in FIG. 3 and are described in greater detail below.

After the processing of step S12 (the steps depicted in FIG. 3), operation moves to step S13. At step S13 in FIG. 2, the data points corresponding to ground points $T_{S3}$ and $T_{S4}$ of the processed point cloud $C_P$ shown in FIG. 17, the lane and ground points (from Step S26 in FIG. 3, as described further below) are further evaluated by the electronic controller 24 for intensity levels in order to identify which data points can possibly be, for instance, lane markings, traffic arrows painted on the roadway, stop-lines and cross-walk lines.

At step S14, the electronic controller 24 fits those ground points that have linear or other geometric relationships (such as possibly defining a curved line) and determines viability of estimating extensions of those line using a gradient/curvature algorithm (aka a gradient descent algorithm) and/or a sliding window detection algorithm. As a result, lane markings such as those depicted in FIGS. 19-23 are identified.

Next at step S15, the electronic controller 24 evaluates various data points in the processed data cloud $C_P$ that have a variety of geometric relationships and define various shapes. Specifically, the electronic controller 24 evaluates groups of data points that define, for instance, arrows, lines, words and lane markings such as stop-lines and cross-walk lines, as shown in FIGS. 19-23.

At step S16, the fully evaluated data points of the processed data cloud $C_P$ are provided to the plurality of driver assistance components 26 for their specific operations. Each of the plurality of driver assistance components 26 is controlled by the electronic controller 24 to conduct operations in accordance with that driver assist component, as described in greater detail below.

The plurality of driver assistance components 26 include one or more (or all) of the following: a navigation application 40 (also referred to as a navigation app 40), an obstacle warning application 42 (also referred to as an obstacle warning app 42), a collision avoidance application 44 (also referred to as a collision avoidance application 44), a lane departure application 46 (also referred to as a lane departure app 46) and a parking assistant application 48 (also referred to as a parking assistant application 48).

The navigation app 40 is a conventional application that utilizes information from the GPS 28 (global positioning satellite system) in order to provide a vehicle operator with driving directions/instructions to reach a selected destination. The lane markings processed point cloud $C_P$ from the electronic controller 24 can be used by the navigation app 40 to enhance local information regarding road conditions and terrain currently around and/or forward of the vehicle 10.

The obstacle warning app 42 is an application that utilizes data from the sonar/radar sensors 20a and provides warnings to a vehicle operator of obstacles close to the vehicle 10. The obstacle warning app 42 is enhanced by the inclusion of lane markings of the processed point cloud $C_P$ from the electronic controller 24 providing warnings of upcoming obstacles in the processed point cloud $C_P$ while those obstacles are dozens of yards ahead of the vehicle 10, in addition to warning of obstacles that are close to or very near the vehicle 10.

Figure 23:
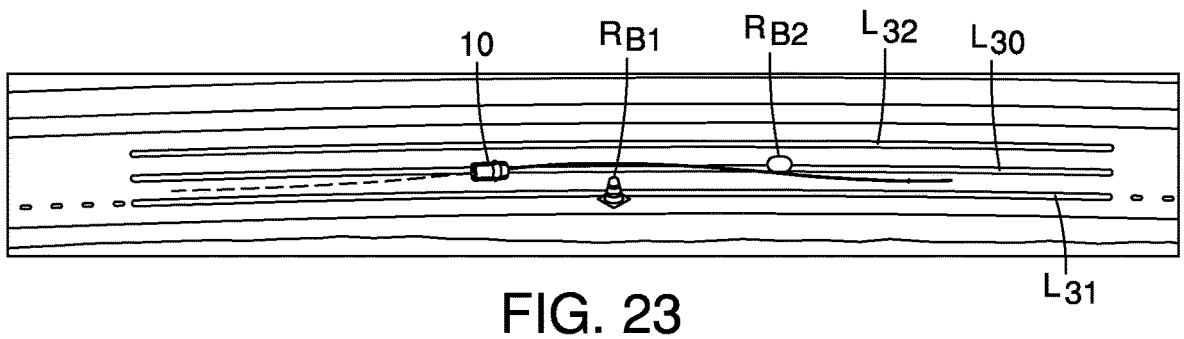
FIG. 23 is an overhead view of a section of roadway showing automatic temporary steering of the vehicle by a collision avoidance application to avoid a possible collision after detection of an obstacle in the roadway ahead with the collision avoidance application using the detected lane markings and detected absence of other vehicle to steer the vehicle around the obstacle in accordance with the first embodiment.

The collision avoidance app 44 is an application that utilizes data from the sonar/radar sensors 20a and data from the GPS 28 to make steering corrections to avoid objects in the path of the vehicle 10, as shown in FIG. 23. Specifically, the electronic controller 24 is programmed to operate the steering system 18 to make minor adjustments in the trajectory of the vehicle 10 and/or operate the braking system 14 in order to avoid contact with obstacles in the path of the vehicle 10 with the vehicle 10 in motion. The collision avoidance app 44 is enhanced by the inclusion of the lane markings of the processed point cloud $C_P$ from the electronic controller 24. Specifically, obstacles in the path of the vehicle 10 result in data points appearing in the processed point cloud $C_P$ from the electronic controller 24. Inclusion of these data points in the processed point cloud $C_P$ provide detection of objects that further forward of the vehicle 10 than can be identified by the sonar/radar sensors 20a. Therefore, when the collision avoidance app 44 is provided with data points that correspond to obstacles that are a greater distance away from the vehicle 10 than those identified by sonar/radar sensors 20a and the electronic controller 24 is provided with a greater period of time to decide whether or not to make a steering correction via the steering system 18 and/or operate the braking system 14.

The lane departure app 46 is an application that conventionally relies on camera data to determine locations of lane divider lines on either side of the vehicle 10. At night when it is dark, such camera data can often be of reduced value. Operation of the lane departure app 46 is enhance by use of the lane markings of the processed point cloud $C_P$ because the first 3D sensor 34 can detect lane divider lines and provide line location to the lane departure app 46 regardless of weather or light conditions.

The parking assistant app 48 is an application that can assist or automatically parallel park the vehicle 10 using feedback from the sonar/radar sensors 20a to prevent contact with adjacent vehicles during the parking process. The parking assistant app 48 is enhanced using the lane markings (which include parking space lines) processed point cloud $C_P$ from the electronic controller 24. Specifically, the processed point cloud $C_P$ includes data points representing reflections of surfaces of objects that are located above or along side the parking space providing the parking assistant app 48 with an improved 3D representation of areas around the vehicle 10, around the parking space and within the parking space.

Returning now to step S12 in FIG. 2, the electronic controller 24 conducts the processes and steps depicted in FIG. 3 in the evaluation of data points in the point cloud accumulated by operation of the first 3D sensor 34.

At step S12, depending on the type of 3D sensor being employed, the data points $P_1$ thru $P_n$ shown in FIG. 5 are pre-processed to properly format the point cloud $C_1$ with the data corresponding to each data point being organized and arranging in the point cloud $C_1$ such that the electronic controller 24 can more advantageously evaluate the data points. Specifically, for each data point $P_1$ thru $P_n$ (FIG. 6) representing a reflection of surface portions of features $F_1$, $F_2$, $F_3$, $F_4$, $F_5$ and $F_6$ and ground portions $G_1$, $G_2$, $G_3$, $G_4$, $G_5$ and $G_6$ as shown in FIGS. 4 and 5 is converted into the point cloud $C_1$ that is partially shown in FIG. 6. Each data point $P_1$ thru $P_n$ has distance, direction and vertical height and is properly arranged for evaluation and processing by the electronic controller 24.

Next at step S21, the electronic controller 24 starts evaluating the data points in the point cloud $C_1$ depicted in FIGS. 5 and 6 to ultimately determine a drivable area (for example, a road surface with lane markings) in areas around the vehicle 10. As described above, the first 3D sensor 34 (a LIDAR device) collects data points that are locations of reflections from surfaces of objects and surfaces adjacent to and forward of the vehicle 10. Each of these data points include direction to the surface (point of reflection), vertical height of the surface and distance to the surface of the point of reflection on the object or obstacle.

Figure 7:
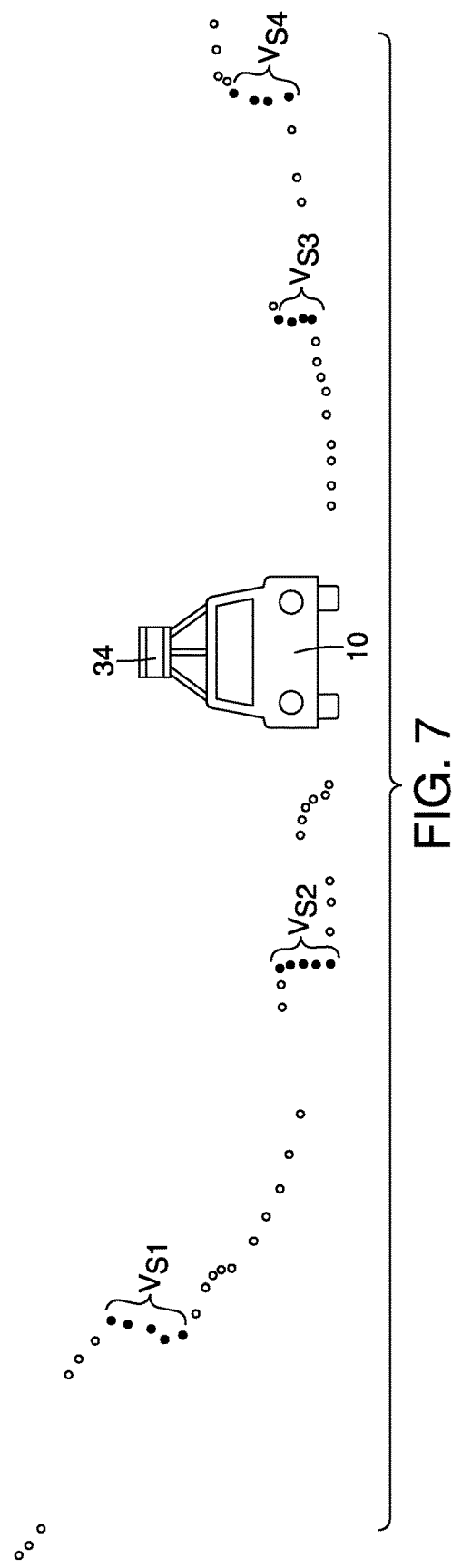
FIG. 7 is still another two-dimensional schematic view of the vehicle and the 3D sensor showing the data points during a first evaluation by the electronic controller where vertical groups of data points are identified, the vertical groups of data points possibly being objects, vehicles, or obstacles around the vehicle in accordance with the first embodiment.

The point cloud $C_1$ shown in FIG. 6 is evaluated using concurrent processing paths. Step S21 is one of those processing paths. At step S21, the electronic controller evaluates the data points in the point cloud $C_1$ and identifies and extracts data points that represent vertical obstacles where groups of data points are stacked one on top of another. Several sub-sets of data points that are arranged in an upright or vertical manner are recognized as defining upright or vertical subsets $V_{S1}$, $V_{S2}$, $V_{S3}$ and $V_{S4}$, as shown in FIG. 7. Evaluating the data point $P_1$ thru $P_n$ in this step is based on a vertical geometric analysis in that obviously vertical sets of points are identified. The upright or vertical subsets $V_{S1}$, $V_{S2}$, $V_{S3}$ and $V_{S4}$ are assumed to be non-drivable areas, objects or obstacles that pose a danger for the vehicle 10, if driven over, or driven near these objects or obstacles. For example, the upright or vertical subsets $V_{S1}$, $V_{S2}$, $V_{S3}$ and $V_{S4}$ are assumed to be the sides of cars, sides of buildings, sides of barriers, side of a box on the road, etc. Thus, the upright or vertical subsets $V_{S1}$, $V_{S2}$, $V_{S3}$ and $V_{S4}$ of data points are designated as non-drivable features.

At step S22, non-vertical data points are extracted and designated as possible ground features, ground candidates and/or a drivable area $D_A$ (described further below). The extraction of non-vertical data points of step S22 can be a separate step from step S21. Alternatively, the extraction of non-vertical data points can be a result of the removal of upright or vertical subsets $V_{S1}$, $V_{S2}$, $V_{S3}$ and $V_{S4}$ identified in Step S21 from the point cloud $C_1$. Either way, the remaining data points after step S22 define terrain subsets $T_{S1}$ and $T_{S3}$ of data points shown in FIG. 8 (a group of data points that represent non-vertical data points from the point cloud $C_1$).

Figure 10:
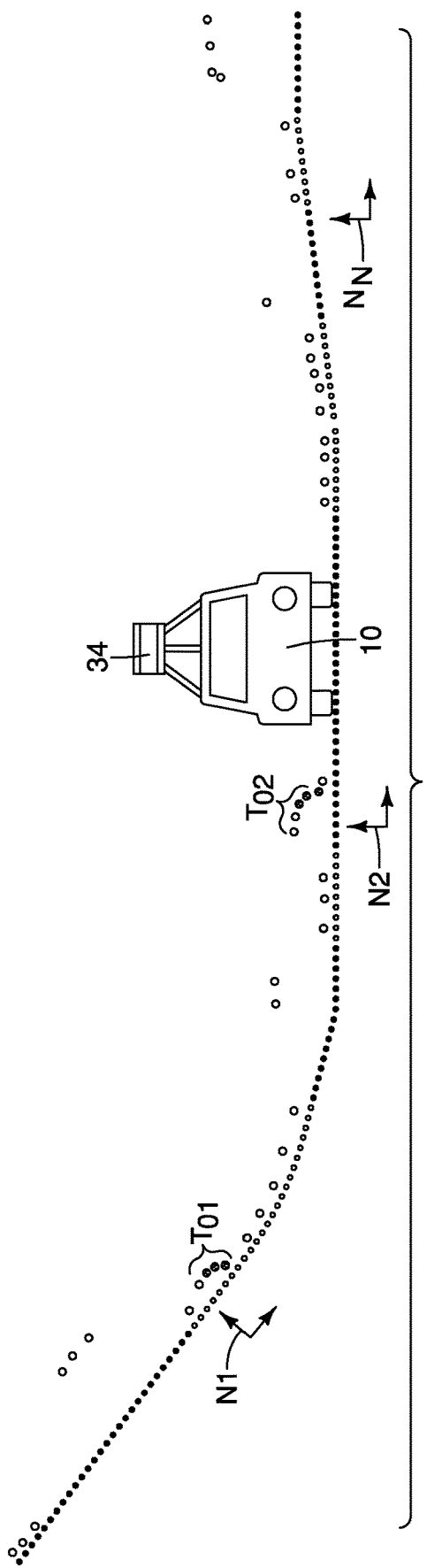
FIG. 10 is another two-dimensional schematic view of the vehicle and the 3D sensor showing elevated groups of elevated non-linear data points being identified by the electronic controller in accordance with the first embodiment.

In step S23, ground data points $G_{S1}$ located beneath the vehicle 10 and shown in FIG. 8 are assumed by the electronic controller 24 to be actual ground points, since the vehicle 10 is in contact with the ground beneath itself. Further, in step S23, using the terrain subsets $T_{S1}$ and $T_{S2}$, the electronic controller 24 extrapolates from the ground data points $G_{S1}$ to the various portions of the terrain subsets $T_{S1}$ and $T_{S2}$ and estimates the actual overall shape and contour of the terrain $T_{S3}$ on one side of the vehicle, and the terrain $T_{S4}$ on an opposite side of the vehicle 10, as shown in FIG. 9. The estimating of terrains $T_{S1}$ and $T_{S4}$ includes a geometric analysis whereby groups of data points in the estimated subsets of terrains $T_{S1}$ and $T_{S4}$ (terrain data), are evaluated by taking lines $N_1$, $N_2$ thru $N_N$ normal to smaller groups of the data points of terrains $T_{S3}$ and $T_{S4}$ thereby determining the overall slope of the actual terrain, as shown in FIG. 10. Thus, as step S23, the electronic controller 24 evaluates the group of data points (subsets $T_{S1}$ and $T_{S2}$) extracted from the point cloud $C_1$ and generates an estimate of terrain proximate the vehicle (terrains $T_{S3}$ and $T_{S4}$) including the drivable area $D_A$ (FIG. 16). The group of data points (subsets $T_{S1}$ and $T_{S2}$) are evaluated by gridding the non-vertical data points and fitting planes to groups of the lowest points in the group of data points (subsets $T_{S1}$ and $T_{S2}$).

Figure 12:
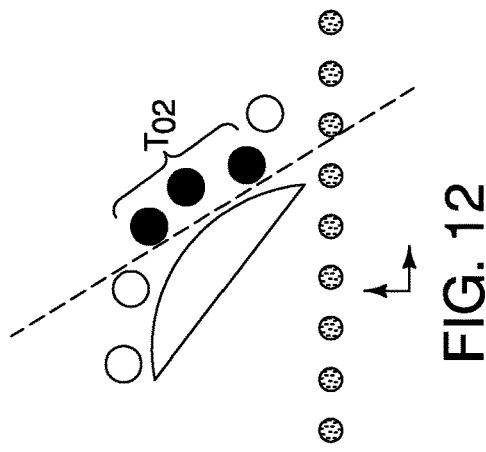
FIG. 12 is a schematic view of a second group of elevated non-linear data points being evaluated by the electronic controller using a line normal to the terrain beneath the second group of elevated non-linear data points identifying the second group as an object or obstacle defining curb or a non-drivable area in accordance with the first embodiment.
Figure 11:
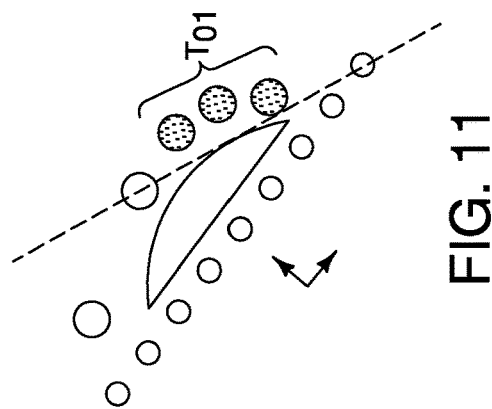
FIG. 11 is a schematic view of a first group of elevated non-linear data points being evaluated by the electronic controller using a line normal to the terrain beneath the first group of elevated non-linear data points identifying the first group as a speed bump in accordance with the first embodiment.
Figure 13:
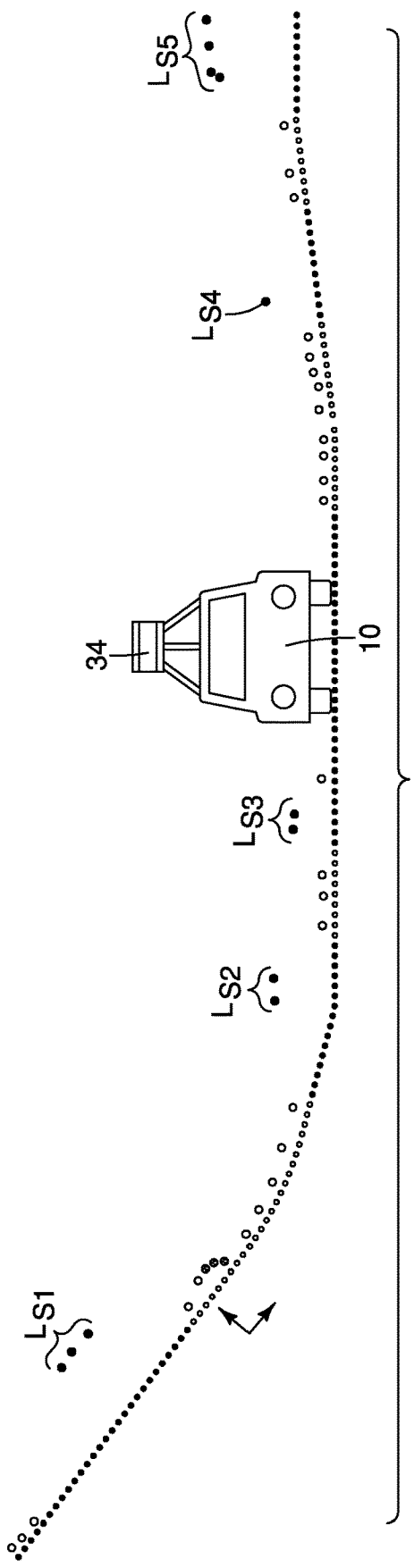
FIG. 13 is another two-dimensional schematic view of the vehicle and the 3D sensor showing elevated groups of elevated linear data points being identified by the electronic controller as upper surfaces of corresponding objects or obstacles defining corresponding non-drivable areas in accordance with the first embodiment.

At step S24, the electronic controller 24 is further configured to identify curb points. One method includes evaluating the group of data points of terrains $T_{S1}$ and $T_{S4}$ representing the estimate of terrain and identify one or more vertical obstacles including one or more curbs along the drivable area $D_A$. Specifically, groups of data points such as groups $T_{O1}$ and $T_{O2}$ of the data points of terrains $T_{S1}$ and $T_{S2}$ appear to be outliers when compared to the data points of terrains $T_{S3}$ and $T_{S4}$. These groups $T_{O1}$ and $T_{O2}$ of the data points are close to the height of the estimated ground surfaces (the data points of terrains $T_{S2}$ and $T_{S4}$) but are stacked somewhat vertically with respect to the slope of the estimated ground surfaces (terrains $T_{S3}$ and $T_{S4}$) calculated in the previous step. The electronic controller identifies data points such as groups $T_{O1}$ and $T_{O2}$ as not being high enough or vertical enough to be caught in step S21 but are still hazardous for the vehicle 10 to drive into/over. These two sets of data points groups $T_{O1}$ and $T_{O2}$ corresponding to a bump-shape are not quite vertical (and thus were not removed in the step S21), but, are close to the estimated ground surface (terrains $T_{S3}$ and $T_{S4}$ and stacked somewhat vertically. Therefore, the electronic controller 24 evaluates these data points, as shown in FIGS. 11 and 12 to determine whether or not they are surfaces of a curb bordering the drivable area $D_A$.

Even though these two groups of data points (groups $T_{O1}$ and $T_{O2}$) represent reflections off of the same object (features $F_2$ and $F_5$ respectively in FIG. 4), the angle that the group $T_{O2}$ forms with respect to the sloped ground plane underneath it is larger than the angle that the group $T_{O1}$ forms with respect to the flat ground plane.

Thus, the group $T_{O1}$ is not considered a curb point, while the group $T_{O2}$ is a considered a curb point. However, the electronic controller 24 determines that the group $T_{O1}$ can be noted as a drivable-but is possibly a speed-bump since it still forms a small angle with respect to the ground plane, the angle in FIG. 11 being less than, for example, 35 degrees.

Figure 14:
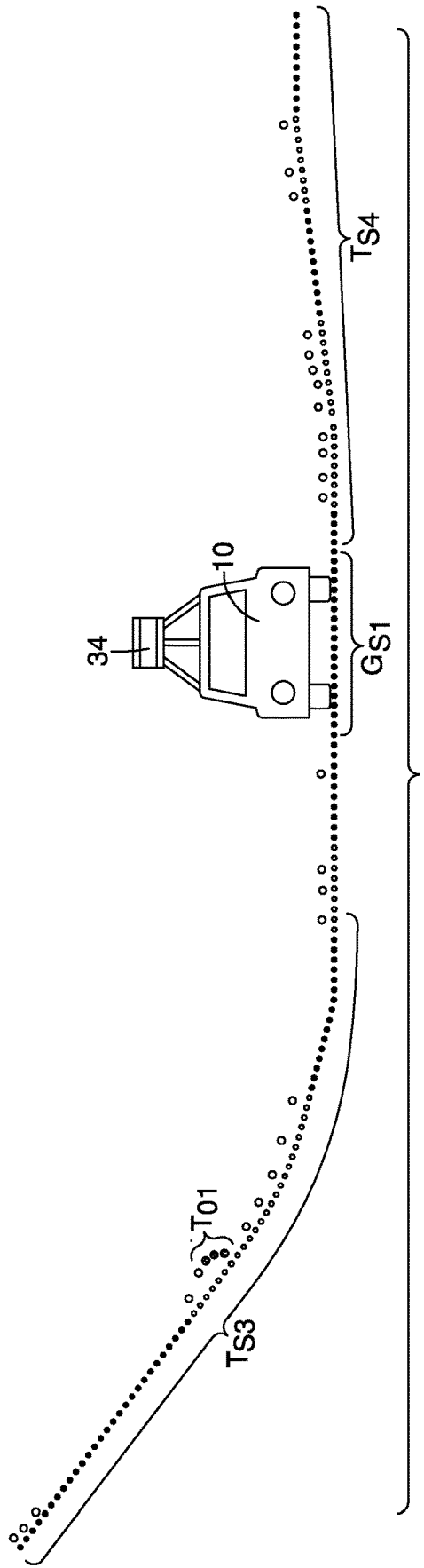
FIG. 14 is two-dimensional schematic view of the vehicle and the 3D sensor showing digital data points of the point cloud identifying terrain around the vehicle with the elevated groups of linear data points removed in accordance with the first embodiment.

At step S25, the electronic controller 24 is further configured to data points by filtering out those portions of the second group of data points that are above a predetermined height relative to the vehicle and the estimate of the terrain in the absence of data points below these data points. Such data points are considered to be, for example, limbs of trees hanging down or other such structures that are too high to interfere with driving of the vehicle 10 and therefore are not obstructions or obstacles. Further, the electronic controller 24 identifies groups of linear groups of data points such as groups $L_{S1}$, $L_{S2}$, $L_{S3}$, $L_4$ and $L_{S5}$. These data point groups $L_{S1}$, $L_{S2}$, $L_{S3}$, $L_4$ and $L_{S5}$ are at respective levels above the terrain $T_{S3}$ and $T_{S4}$ such that they are considered to be upper surfaces of obstacles and are extracted from the terrains $T_{S3}$ and $T_{S4}$. Thus, as shown in FIG. 14, the terrains $T_{S3}$ and $T_{S4}$ along with data points group $T_{O1}$ show a digital representation of the ground or terrain around the vehicle 10.

At step S26 ground points (including terrain) identified and extracted in steps S22 and S23 can be used accordingly in subsequent evaluations when control returns to FIG. 2, as described above.

At step S27, the various groups of data points extracted in the steps above that were not discarded or ignored are combined together to form a digital rendering of the areas around the vehicle 10, as shown in FIG. 15. Specifically, the ground data points $G_{S1}$, the ground data points in groups terrain $T_{S3}$ and $T_{S4}$, vertical data groups $V_{S1}$, $V_{S2}$, $V_{S3}$ and $V_{S4}$, linear data point groups $L_{S1}$, $L_{S2}$, $L_{S3}$, $L_4$ and $L_{S5}$, curb data points of group $T_{O1}$ and object data points group $T_{O2}$ are all combined in a single digital data point set (evaluated point cloud $C_P$).

Next at step S28, the electronic controller 24 evaluates drivable areas (areas without obstructions or obstacles) of the ground data points $G_{S1}$ and the terrain $T_{S1}$ and $T_{S1}$ as compared to all of the data groups shown in FIG. 15. As a result, at step S29, the drivable area $D_A$ is identified between the obstacle $F_4$ represented by the data points of group $T_{O2}$ and the obstacle F5 represented by data points of group $V_{S3}$, as shown in FIG. 16.

After step S29, operation returns to the flowchart in FIG. 2 to step S13.

Figure 17:
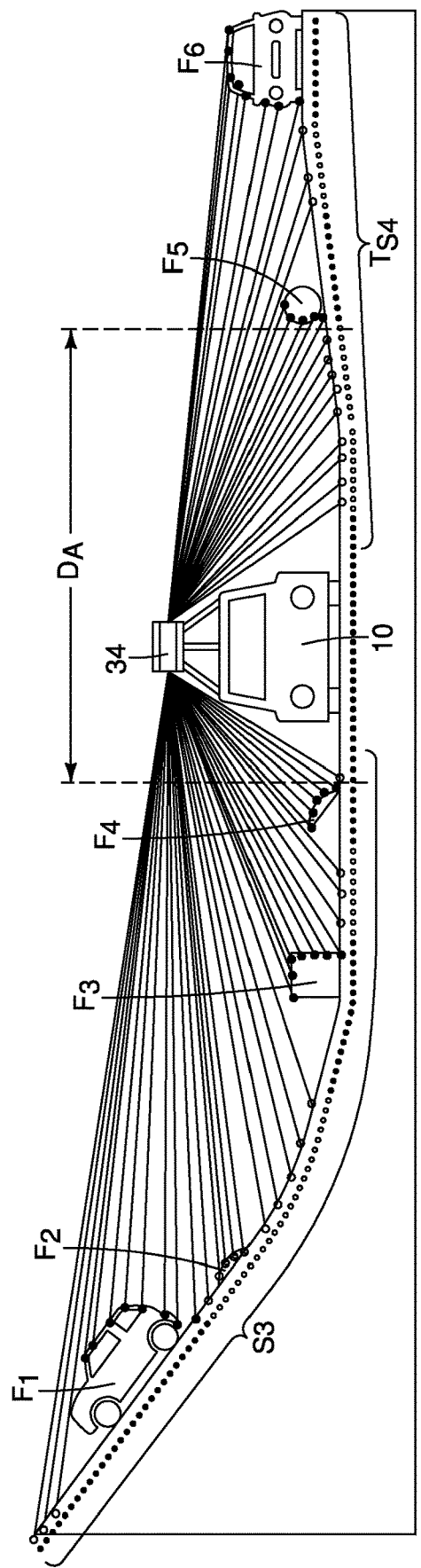
FIG. 17 is a two-dimensional view of the digital data points of the data cloud after evaluation by the electronic controller with the objects and obstacles shown in FIG. 4 superimposed on the digital data points in accordance with the first embodiment.

As should be understood from the above description, the data points of the processed point cloud depicted in FIGS. 15-17 is prepared as evaluated or processed point cloud $C_P$ only by conducting geometric evaluations of relationships of groups of data points in the original point cloud $C_1$. The vehicle lane marking detection system 12 evaluates the point cloud $C_1$ without object recognition applications or processing.

The above described extractions of data points of the processed point cloud $C_P$ from the point cloud $C_1$ provides a digital map of detailed information regarding identification of the lane markings around the vehicle 10, such as those shown in FIGS. 18-23. In FIG. 18, the detailed information can be supplemented with vertical data from the steps in FIG. 3 from the point cloud $C_1$ that identifies street signs, a stop light, and/or traffic signs (stop signs and yield signs) as well as other road related features.

Figure 19:
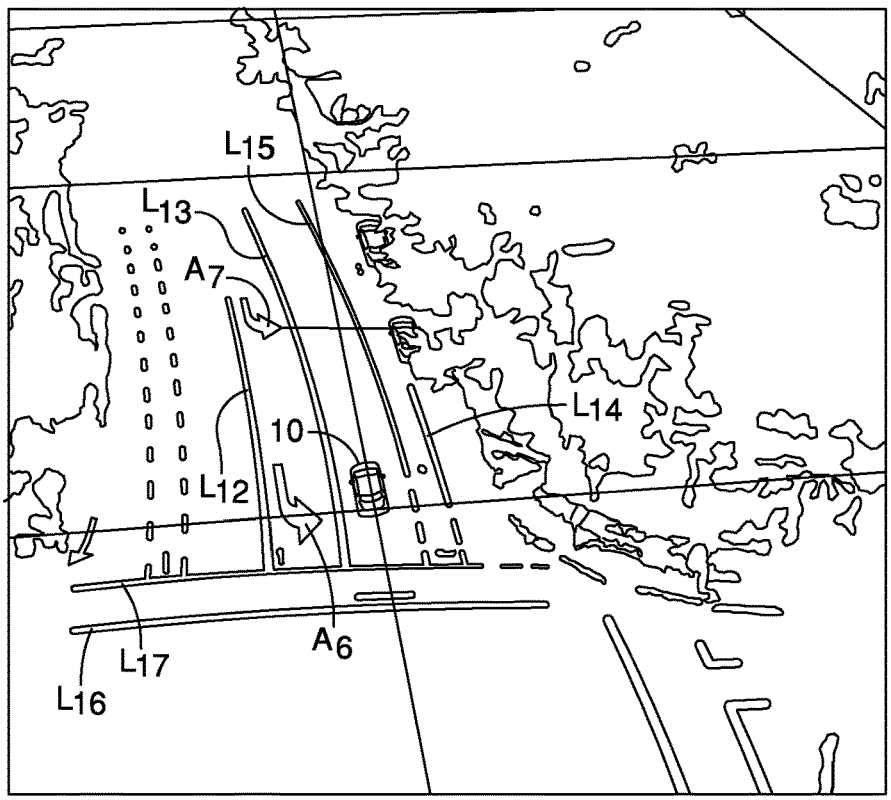
FIG. 19 is another overhead digital view of the evaluated and filtered point cloud showing drivable areas bordered by more lane marking lines and traffic arrows along or defining drivable areas in accordance with the first embodiment.

In FIG. 18, lane marking lines $L_1$, $L_2$, $L_3$, $L_4$, $L_5$, $L_6$ and $L_7$ based on data points identified as being lane marking paint are shown along with traffic directional arrows $A_1$, $A_2$, $A_3$, $A_4$ and $A_5$. In FIG. 19, lane lines $L_{12}$, $L_{13}$, $L_{14}$, $L_{15}$, and $L_{16}$, along with cross walk lines $L_{17}$ and $L_7$ are shown along with traffic directional arrows $A_6$ and $A_7$.

Figure 20:
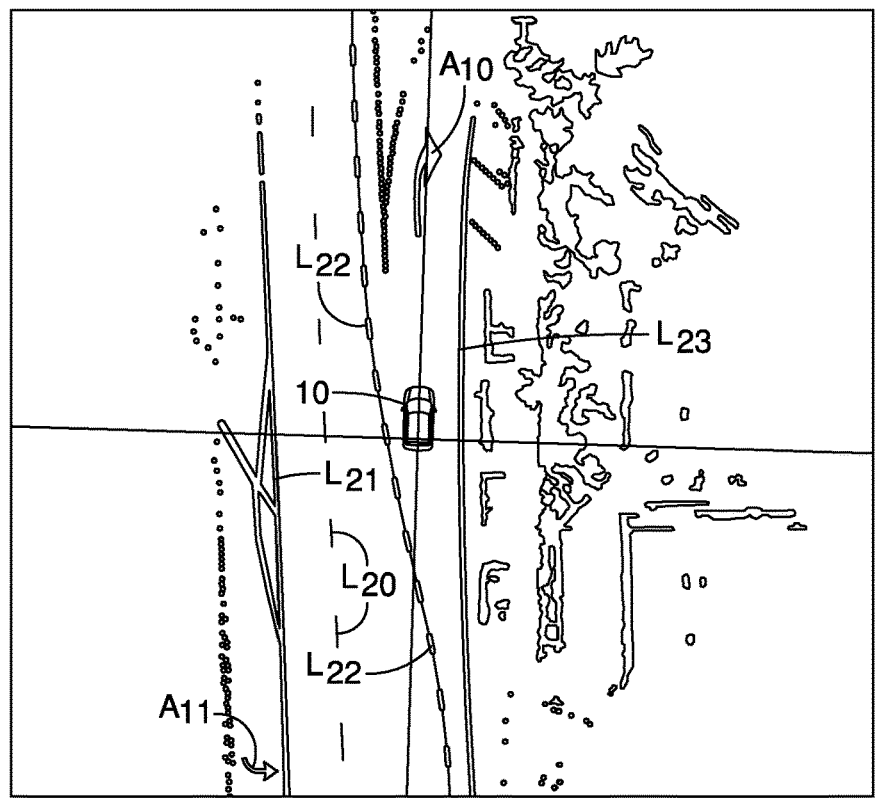
FIG. 20 is another overhead digital view of the evaluated and filtered point cloud showing drivable areas bordered by more lane marking lines and traffic arrows along or defining drivable areas in accordance with the first embodiment.

In FIG. 20, lines $L_{20}$, $L_{21}$, $L_{22}$ and $L_{23}$, are shown along with traffic directional arrows $A_{10}$ and $A_{11}$.

In FIG. 21 a curving road is indicated by two curved lane marking lines $L_{25}$ and $L_{26}$. Extrapolations of curved lane marking lines $L_{25}$ and $L_{26}$ as performed at step S28 in FIG. 3 yield estimated projection of lines $L_{27}$ and $L_{28}$.

Figure 22:
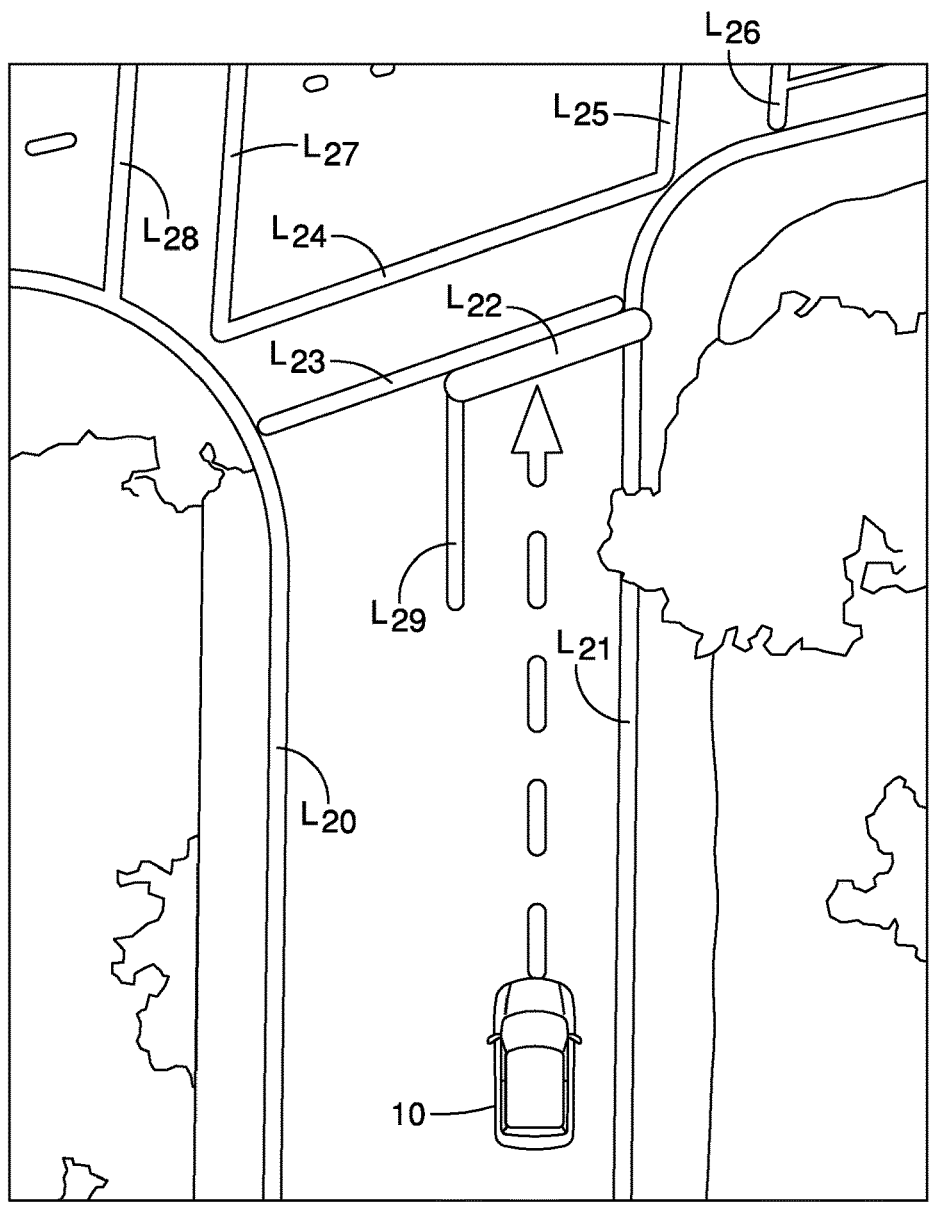
FIG. 22 is another overhead digital view of the evaluated and filtered point cloud showing a straight roadway bordered by correspondingly straight lane marking lines and traffic arrows further showing an estimated a stop-line traversing the right-hand-side lane in accordance with the first embodiment.

In FIG. 22, lines $L_{20}$, $L_{21}$ and $L_{29}$ represent lane markings, line $L_{22}$ represents a stop line. Further, lines $L_{23}$, $L_{24}$, $L_{25}$, $L_{26}$, $L_{27}$ and $L_{28}$ are derived from data points that represent cross-walk lines.

The plurality of driver assist components 26 use the digital maps shown in FIGS. 18-23 derived from data points identified as representing lane markings, traffic arrows and cross-walks in their respective operations, as discussed above. For example, an operation of the collision avoidance app 44 is demonstrated in FIG. 23. Road blocks or obstacles $R_{B1}$ and $R_{B2}$ are detected in the roadway ahead of the vehicle 10 by the lane marking detection system 12 or sonar/radar system of the vehicle. The collision avoidance app 44 takes temporary control of the steering system 18 and steers the vehicle 10 across one of lane marking lines $L_{30}$ and $L_{31}$ part way into the lane defined by lane lines $L_{30}$ and $L_{32}$ to avoid contact with obstacle $R_{B1}$ then returns the vehicle 10 to a location between the lane markings $L_{30}$ and $L_{31}$ to avoid contact with obstacle $R_{B2}$.

Further, in an alternative embodiment, the output (the processed point cloud) can be used to annotate the Around-view-monitor available in many vehicles.

The various structural vehicle features and vehicle components are conventional components that are well known in the art. Since such structural vehicle features and vehicle components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the drivable area detection system. Accordingly, these terms, as utilized to describe the present invention should be interpreted relative to a vehicle equipped with the drivable area detection system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle lane marking detection system, comprising:
a vehicle;
at least one 3D sensor mounted to the vehicle and being configured to scan physical objects forward of and along lateral sides of the vehicle outputting a point cloud that includes a plurality of data points while the vehicle is operating, the at least one 3D sensor operating while the vehicle is operating;
at least one driver assist component within the vehicle; and
an electronic controller within the vehicle, the electronic controller being connected to the at least one 3D sensor and the at least one driver assist component, the electronic controller being configured to:
accumulate a plurality of point clouds outputted from the at least one 3D sensor by determining a relative pose estimate of the 3D sensor, each data point of each of the plurality of point clouds corresponding to a surface point of a physical feature, each data point being defined by distance, direction, intensity and vertical location relative to the vehicle, and the relative pose estimate being determined based on at least one of wheel odometry of the vehicle and movement data from a vehicle speed sensor,
evaluate each of the plurality of point clouds identifying ground features forward and along lateral sides of the vehicle,
remove all data points from each of the plurality of point clouds with vertical locations above a predetermined height of ground,
identify data points related to roadway lane markings based on intensity of the data points, evaluating the data points having intensities greater than a predetermined level, further evaluating the data points having intensities greater than the predetermined level to geometric shapes including straight, non-parallel lines and curved lines corresponding to lane marking models identifying lane markings and cross-walk lines and curved road lines while the vehicle is operating, and
provide the at least one driver assist component with the lane markings for use thereby while the vehicle is operating.

2. The vehicle lane marking detection system according to claim 1, wherein
the at least one 3D sensor is configured to repeatedly scan physical objects forward of and along lateral sides of the vehicle while the vehicle is in motion to produce the corresponding plurality of point clouds.

3. The vehicle lane marking detection system according to claim 1, wherein
the at least one driver assist component includes at least one of the following components: a navigation unit, a collision avoidance application, a lane departure preventing application and a parking assistant.

4. The vehicle lane marking detection system according to claim 1, further comprising
an electronic display within the vehicle connected to the electronic controller, the electronic controller providing the electronic display with the digital lane markings for display thereon.

5. The vehicle lane marking detection system according to claim 1, wherein
the at least one driver assist component includes a navigation unit, and
the electronic controller is configured to align navigation data from the navigation unit with the digital lane markings.

6. The vehicle lane marking detection system according to claim 1, wherein
the at least one driver assist component includes a collision avoidance application, and
the electronic controller is configured to detect and determine location of obstacles ahead of the vehicle relative to the digital lane markings and provide distance and location of obstacles to the collision avoidance application.

7. The vehicle lane marking detection system according to claim 1, wherein
the at least one driver assist component includes a lane departure preventing application, and
the electronic controller is configured to assist the lane departure preventing application in determining location of the vehicle relative to the digital lane markings.

8. The vehicle lane marking detection system according to claim 1, wherein
the at least one driver assist component includes a parking assistant, and
the electronic controller is configured to provide the parking assistant with location and distance to the digital lane markings and extracted data points corresponding to curb-like vertical surfaces proximate the vehicle during a parking maneuver controlled by the parking assistant.

9. The vehicle lane marking detection system according to claim 1, wherein
the electronic controller is configured to evaluate the data from the 3D sensor and create a point cloud that includes data points representing vertical obstacles and non-vertical obstacles.

10. The vehicle lane marking detection system according to claim 1, wherein
at least one 3D sensor is a LIDAR device installed on the vehicle proximate a central area of a roof of the vehicle oriented to scan areas forward and along lateral sides of the vehicle.

11. The vehicle lane marking detection system according to claim 10, wherein
the intensity of each of the data points evaluated by the electronic controller corresponds to an intensity of laser signals from the LIDAR device reflected off surfaces forward of or along lateral sides of the vehicle that are detected by the LIDAR device.

12. The vehicle lane marking detection system according to claim 10, wherein
the vehicle includes a second LIDAR device positioned on the vehicle to scan areas rearward of the vehicle and scan areas that are along rearward lateral sides of the vehicle.

13. A method for detecting lane markings on a roadway, comprising:
scanning areas forward and along lateral sides of a vehicle using at least one 3D sensor thereby generating data while the vehicle is operating;
pre-processing the data from the at least one 3D sensor to produce a point cloud having a plurality of data points, each data point representing distance, height, intensity and direction of features relative to the vehicle while the vehicle is operating;
accumulating a plurality of point clouds outputted from the at least one 3D sensor by determining a relative pose estimate of the 3D sensor, the relative pose estimate being determined based on at least one of wheel odometry of the vehicle and movement data from a vehicle speed sensor;
evaluating each of the plurality of point clouds identifying ground surfaces around the vehicle eliminating groups of data points above a predetermined height while the vehicle is operating;
evaluating light intensity of each of the plurality of data points of each of the plurality of point clouds and eliminating all data points below a predetermined intensity threshold while the vehicle is operating;
comparing groups of data points to stored geometric patterns identifying lane markings of a road surface that include straight, non-parallel and curved lines corresponding to lane marking models identifying markings including cross-walk lines and curved road lines while the vehicle is in motion; and
providing the location and distance of identified lane markings to at least one driver assist component for driving related actions in accordance with the at least one driver assist component while the vehicle is operating.

14. The method for detecting lane markings on a roadway according to claim 13, further comprising
repeating the scanning of areas while vehicle is in motion to form the plurality of point clouds.

15. The method for detecting lane markings on a roadway according to claim 13, wherein
the scanning is performed by a first LIDAR device fixed to the vehicle.

16. The method for detecting lane markings on a roadway according to claim 15, further comprising
scanning areas rearward and along rearward lateral sides of a vehicle using a second 3D sensor thereby generating data.

17. The method for detecting lane markings on a roadway according to claim 16, wherein
the scanning of areas rearward and along rearward lateral sides of the vehicle is performed by a second LIDAR device fixed to the vehicle.

18. The method for detecting lane markings on a roadway according to claim 13, wherein
the scanning is performed by a first LIDAR device.

* * * * *